United States Patent
Zeng et al.

(10) Patent No.: US 11,700,227 B2
(45) Date of Patent: Jul. 11, 2023

(54) IDENTIFIER RESOLUTION METHOD AND APPARATUS FOR THE INTERNET OF THINGS

(71) Applicant: CHINA INTERNET NETWORK INFORMATION CENTER, Beijing (CN)

(72) Inventors: Yu Zeng, Beijing (CN); Hongtao Li, Beijing (CN); Anlei Hu, Beijing (CN); Kejun Dong, Beijing (CN); Zhiwei Yan, Beijing (CN); Zhiyang Wang, Beijing (CN); Qi Yang, Beijing (CN); Weihong Hu, Beijing (CN)

(73) Assignee: CHINA INTERNET NETWORK INFORMATION CENTER, Beijing (CN)

( * ) Notice: Subject to any disclaimer, the term of this patent is extended or adjusted under 35 U.S.C. 154(b) by 301 days.

(21) Appl. No.: 17/250,214

(22) PCT Filed: Oct. 26, 2020

(86) PCT No.: PCT/CN2020/123561
§ 371 (c)(1),
(2) Date: Dec. 16, 2020

(87) PCT Pub. No.: WO2022/062025
PCT Pub. Date: Mar. 31, 2022

(65) Prior Publication Data
US 2022/0321523 A1  Oct. 6, 2022

(30) Foreign Application Priority Data
Sep. 28, 2020  (CN) .......................... 202011041774.0

(51) Int. Cl.
G06F 15/16   (2006.01)
H04L 61/103  (2022.01)
(Continued)

(52) U.S. Cl.
CPC ............ *H04L 61/103* (2013.01); *H04L 69/22* (2013.01); *H04L 61/4511* (2022.05)

(58) Field of Classification Search
CPC .......................... H04L 61/4511; H04L 61/103
(Continued)

(56) References Cited

U.S. PATENT DOCUMENTS

2016/0182446 A1  6/2016  Kong et al.
2019/0166085 A1*  5/2019  Li .......................... H04L 9/0618
(Continued)

FOREIGN PATENT DOCUMENTS

CN   101751432 A    6/2010
CN   103347036 A   10/2013
(Continued)

OTHER PUBLICATIONS

International Search Report and Written Opinion dated Jun. 23, 2021, in related PCT Application No. PCT/CN2020/123561.
(Continued)

*Primary Examiner* — Hee Soo Kim
(74) *Attorney, Agent, or Firm* — Maschoff Brennan

(57) ABSTRACT

Provided are an identifier resolution method and apparatus for the Internet of Things. In the method, different identifier resolution systems are compatible through constructing an identifier resolution architecture for the Internet of Things, and a unified method is used for resolving various identifiers. Therefore, it is simply required to maintain one identifier resolution architecture for the Internet of Things when resolving different identifiers, which reduces the workload and difficulty for maintenance of the identifier resolution system and thus reduces the workload and difficulty for maintenance of the Internet of Things.

10 Claims, 6 Drawing Sheets

(51) Int. Cl.
*H04L 69/22* (2022.01)
*H04L 61/4511* (2022.01)

(58) Field of Classification Search
USPC .......................................................... 709/245
See application file for complete search history.

(56) References Cited

U.S. PATENT DOCUMENTS

2020/0016233 A1   1/2020  Conboy et al.
2020/0252220 A1*  8/2020  McBride ................. H04L 41/16

FOREIGN PATENT DOCUMENTS

| | | | | |
|---|---|---|---|---|
| CN | 103491145 A | | 1/2014 | |
| CN | 108366356 A | * | 8/2018 | ............. H04L 61/15 |
| CN | 108366356 A | | 8/2018 | |
| CN | 108389045 A | | 8/2018 | |
| CN | 109672760 A | | 4/2019 | |
| CN | 110941611 A | | 3/2020 | |
| WO | WO-2015032155 A1 | * | 3/2015 | ............. H04L 61/10 |
| WO | WO-2020011373 A1 | * | 1/2020 | ......... G06F 16/1805 |

OTHER PUBLICATIONS

Chinese Office Action dated Jun. 3, 2021, in priority Chinese Application No. 202011041774.0.

* cited by examiner

IDENTIFIER RESOLUTION METHOD AND APPARATUS FOR THE INTERNET OF THINGS

This application is the national phase of International Application No. PCT/CN2020/123561, titled "IDENTIFIER RESOLUTION METHOD AND APPARATUS FOR THE INTERNET OF THINGS", filed on Oct. 26, 2020 which claims the priority to Chinese Patent Application No. 202011041774.0, titled "IDENTIFIER RESOLUTION METHOD AND APPARATUS FOR THE INTERNET OF THINGS", filed on Sep. 28, 2020 with the China National Intellectual Property Administration (CNIPA), which is incorporated herein by reference in its entirety.

FIELD

The present disclosure relates to the field of computer technology, and in particular to an identifier resolution method and apparatus fir the Internet of Things.

BACKGROUND

At present, the development of internet of things has entered a new era, that is, "the Internet of Things" period. The network scale of the Internet of Things is even larger than that of internet of things.

For the Internet of Things with a huge network scale, it is essential to reduce the workload and difficulty for network maintenance. How to reduce the maintenance workload and difficulty for the Internet of Things has become a problem.

SUMMARY

To solve the above technical problems, an identifier resolution method and apparatus for the Internet of Things are provided in embodiments of the present disclosure, so as to achieve the objective of reducing workload and difficulty for maintenance of an identifier resolution system and hence reducing the workload and difficulty for maintenance of the Internet of Things. The technical solution is as follows.

An identifier resolution method for the Internet of Things, which is based on an identifier resolution architecture for the Internet of Things, where the identifier resolution architecture for the Internet of Things includes: an access layer, a conversion layer and an identifier root service layer, in which, the access layer is configured to access at least one identifier resolution system;

the conversion layer is at least configured for conversion between an identifier and a domain name; and the identifier root service layer includes an alliance chain and an identifier root service for the Internet of Things, where the alliance chain includes at least one preselected node and at least one data distribution node; each preselected node separately stores a different type of root data, and the data distribution node is configured to synchronize the root data in each preselected node to the identifier root service for the Internet of Things;

the identifier resolution method includes:

obtaining, by the conversion layer, a to-be-resolved identifier from an identifier resolution request, and determining whether the to-be-resolved identifier can be converted, in response to receiving the identifier resolution request;

converting the to-be-resolved identifier into a domain name, when the to-be-resolved identifier can be converted;

requesting, by the conversion layer, domain name root data corresponding to the domain name from the identifier root service for the Internet of Things; and obtaining, by the conversion layer, a domain name resolution system from the access layer upon receiving the domain name root data returned by the identifier root service for the Internet of Things, and resolving the domain name based on the domain name root data and the domain name resolution system.

The identifier resolution method further includes:

requesting identifier root data corresponding to the to-be-resolved identifier from the identifier root service for the Internet of Things, when the to-be-resolved identifier cannot be converted;

obtaining an identifier resolution system from the access layer upon receiving the identifier root data returned by the identifier root service for the Internet of Things, and resolving the to-be-resolved identifier based on the identifier root data and the identifier resolution system.

Before the requesting, by the conversion layer, domain name root data corresponding to the domain name from the identifier root service for the Internet of Things, the identifier resolution method further includes:

looking up, by the conversion layer, an address corresponding to the domain name in a local resolution server;

obtaining the address corresponding to the domain name from the local resolution server, if the address corresponding to the domain name has been found; and requesting the domain me root data corresponding to the domain name from the identifier root service for the Internet of Things, if the address corresponding to the domain name does not been found.

The obtaining a to-be-resolved identifier from the identifier resolution request includes:

recognizing an identifier in the identifier resolution request based on a machine learning classification model, and determining the recognized identifier as the to-be-resolved identifier, where the machine learning classification model is trained with a training set of identifier samples.

The identifier resolution system includes at least one of a DNS resolution system, a Handle resolution system, an OID resolution system and an EPC system.

An identifier resolution apparatus fix the Internet of Things, includes an access layer module, a conversion layer module and an identifier root service layer module, in which, the access layer module is configured to access at least one identifier resolution system;

the identifier root service layer module includes an alliance chain and an identifier root service for the Internet of Things, where the alliance chain includes at least one preselected node and at least one data distribution node, each preselected node separately stores a different type of root data, and the data distribution node is configured to synchronize the root data in each preselected node to the identifier root service for the Internet of Things; and the conversion layer module is configured to:

obtain a to-be-resolved identifier from an identifier resolution request in response to receiving the identifier resolution request, and determine whether the to-be-resolved identifier can be converted;

convert the to-be-resolved identifier into a domain name when the to-be-resolved identifier can be converted; and request domain name root data corresponding to the domain name from the identifier root service for the Internet of Things, obtain a domain name resolution system from the access layer upon receiving the domain name root data returned by the identifier root service for the Internet of Things, and resolve the domain name based on the domain name root data and the domain name resolution system.

The conversion layer module is further configured to:

request identifier root data corresponding to the to-be-resolved identifier from the identifier root service for the Internet of Things, when the to-be-resolved identifier cannot be converted; and obtain an identifier resolution system from the access layer upon receiving the identifier root data returned by the identifier root service for the Internet of Things, and resolve the to-be-resolved identifier based on the identifier root data and the identifier resolution system.

The conversion layer module is further configured to:

look up an address corresponding to the domain name in a local resolution server, before requesting the domain name root data corresponding to the domain name from the identifier root service for the Internet of Things;

obtain the address corresponding to the domain name from the local resolution server, if the address corresponding to the domain name has been found; and request the domain name root data corresponding to the domain name from the identifier root service for the Internet of Things, if the address corresponding to the domain name does not been found.

The conversion layer module is configured to:

recognize an identifier in the identifier resolution request based on a machine learning classification model, and determine the recognized identifier as the to-be-resolved identifier, where the machine learning classification model is trained with a training set of identifier samples.

The identifier resolution system includes at least one of a DNS resolution system, a Handle resolution system, an OID resolution system and an EPC system.

Compared with the conventional technology, the present disclosure has the following beneficial effects.

In the present disclosure, different identifier resolution systems are compatible through constructing an identifier resolution architecture for the Internet of Things, and a unified method is used for resolving various identifiers. Therefore, it is simply required to maintain one identifier resolution architecture for the Internet of Things when resolving different identifiers, which reduces the workload and difficulty for maintenance of the identifier resolution system and thus reduces the workload and difficulty for maintenance of the Internet of Things.

BRIEF DESCRIPTION OF THE DRAWINGS

The drawings to be used in the description of the embodiments will be described briefly as follows, so that the technical solutions according to the embodiments of the present disclosure will become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

In the following, the technical solutions of the embodiments of the present disclosure will be described clearly and completely in conjunction with the accompanying drawings of the embodiments of the present disclosure. Obviously, the described embodiments are only part of embodiments of the present disclosure, rather than all of the embodiments. All other embodiments obtained by those skilled in the art based on these embodiments of the present disclosure without any creative work fall within the scope of protection of the present disclosure.

Under the technical background that for the Internet of Things with a huge network scale, it is essential to reduce the workload and difficulty for network maintenance, the inventor found that currently different identifier resolution systems are configured in the Internet of Things and different types of identifiers are resolved by the different identifier resolution systems. However, such way requires maintaining multiple identifier resolution systems, the maintenance has a heavy workload and is difficult. The inventor also found that under the situation of having a heavy workload and difficulty for maintaining the identifier resolution systems, it will inevitably increase the maintenance workload and difficulty of the Internet of Things. Therefore, an identifier resolution architecture for the Internet of Things and an identifier resolution method for the Internet of Things are provided, so as to reduce the workload and difficulty for maintenance of the identifier resolution system.

Figure 1:
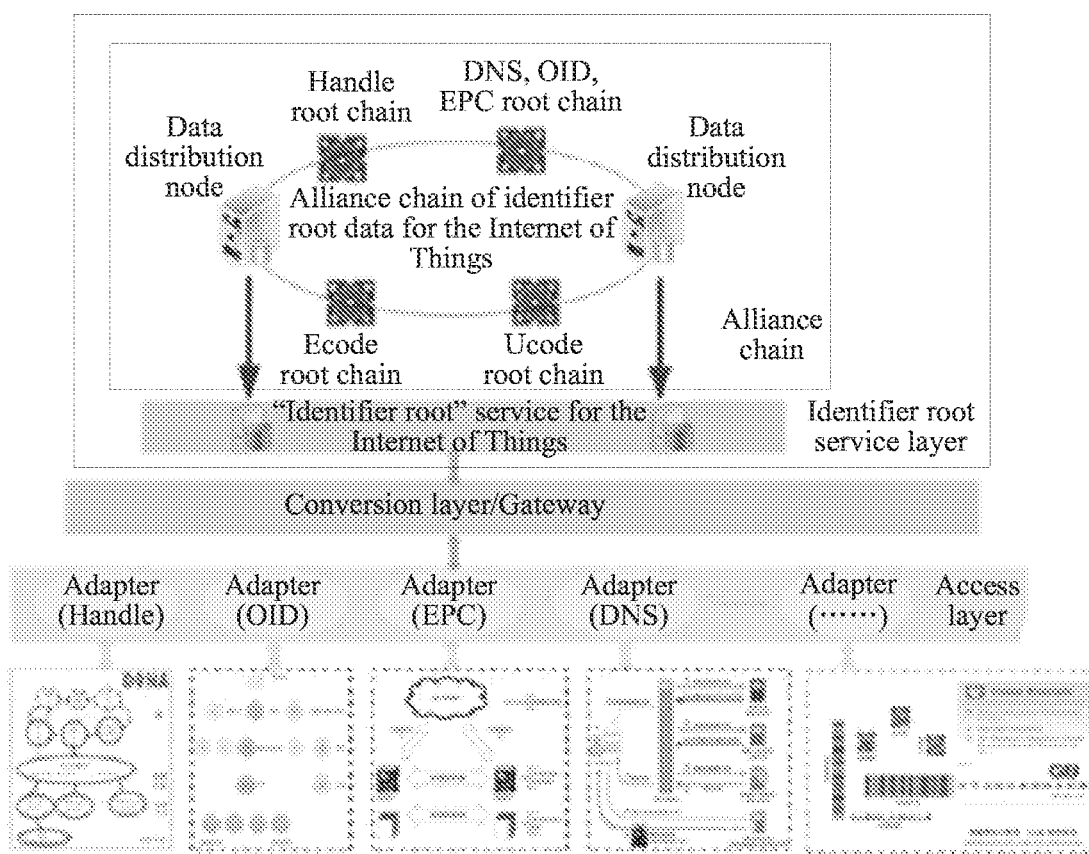
FIG. 1 shows a schematic structural diagram of the identifier resolution architecture for the Internet of Things according to the present disclosure.

In the following, as shown in FIG. 1, the identifier resolution architecture for the Internet of Things according to an embodiment of the present disclosure will be introduced. The identifier resolution architecture for the Internet of Things includes an access layer, a conversion layer and an identifier root service layer.

The access layer is configured to access at least one identifier resolution system.

The at least one identifier resolution system includes, but is not limited to, any one or more of: Domain Name System (DNS) resolution system, Handle resolution system, Object Identifier (OLD) resolution system, Electronic Product Code (EPC) system.

The conversion layer is at least configured for conversion between an identifier and a domain name.

The identifier root service layer includes an alliance chain and an identifier root service for the Internet of Things.

The alliance chain includes at least one preselected node and at least one data distribution node; each preselected node separately stores a different type of root data, and the data distribution node is configured to synchronize the root data in each preselected node to the identifier root service for the Internet of Things.

The data distribution node synchronizes the root data in each preselected node to the identifier root service for the Internet of Things, so that the identifier root service for the Internet of Things may serve as a data intermediary, to improve the efficiency of data access.

The preselected node may be a DNS preselected node, a Handle preselected node, an OID preselected node, or an EPC preselected node. The DNS preselected node is configured to store domain name root data; the Handle preselected node is configured to store Handle root data; the OID preselected node is configured to store OID root data; and the EPC preselected node is configured to store EPC root data.

The identifier root service for the Internet of Things may receive and respond to a data acquisition request sent by the conversion layer, and distribute corresponding data to the conversion layer.

By fully adapting management modes of different types of identifiers, the identifier root service for the Internet of Things can realize the migration of an identifier root system to a blockchain without changing the existing mechanism, and create a more secure management system of the identifier root data.

Different types of root data are stored in pre-selected nodes in the alliance chain respectively, thus realizing data synchronization of the blockchain and monitoring security events in real time. Smart contracts are called, to coordinate the vote initiation of various parties, carry out a decision, or respond to an emergency event. The identifier systems in the Internet of Things become equitable, equal and transparent, which can avoid unilateral control risks and improve the security and credibility of root data management.

The identifier resolution architecture for the Internet of Things realizes the barrier-free access of identifier data, breaks the information islands caused by heterogeneous identifier systems, and lays the foundation for data interoperability in different application scenarios.

Figure 2:
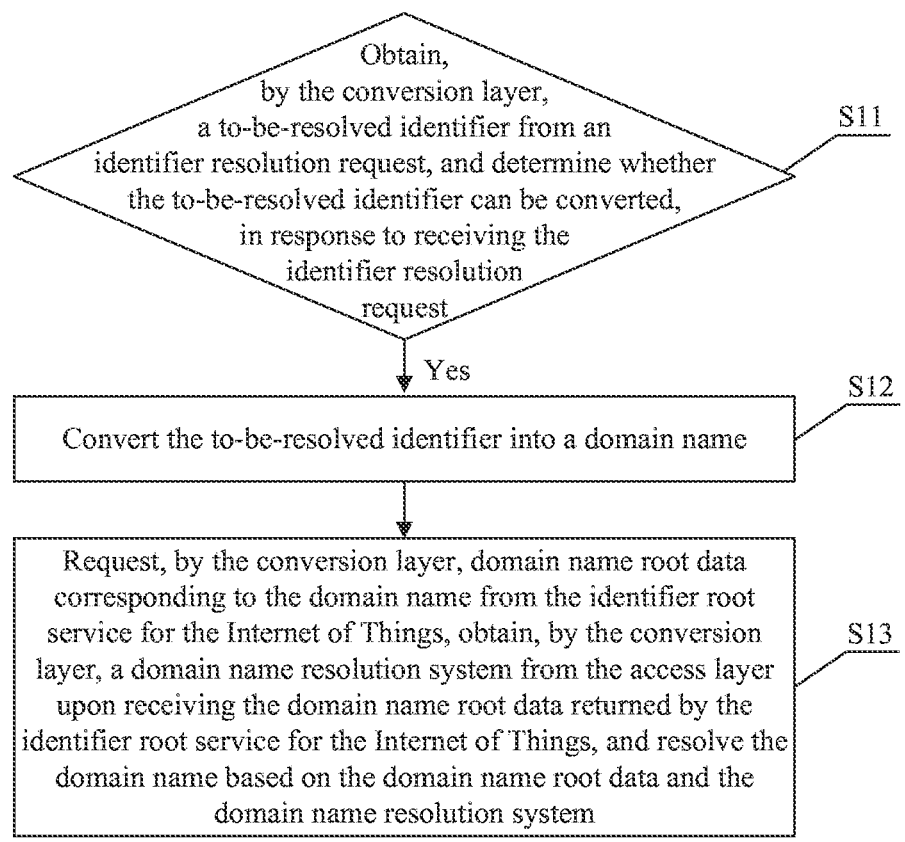
FIG. 2 shows a flow chart of an identifier resolution method for the Internet of Things according to a first embodiment of the present disclosure.

In the following, an identifier resolution method for the Internet of Things based on an identifier resolution architecture for the Internet of Things according to an embodiment of the present disclosure will be introduced. FIG. 2 shows a flow chart of an identifier resolution method for the Internet of Things according to a first embodiment of the present disclosure, and the identifier resolution method may include the following steps S11-S13.

In step S11, a to-be-resolved identifier is obtained from an identifier resolution request and it is to determine whether the to-be-resolved identifier can be converted, when the conversion layer receives the identifier resolution request.

In this embodiment, the obtaining a to-be-resolved identifier from an identifier resolution request may include:

Recognizing an identifier in the identifier resolution request based on a machine learning classification model, and determining the recognized identifier as the to-be-resolved identifier. The machine learning classification model is trained with a training set of identifier samples.

The identifier is recognized in the identifier resolution request based on a machine learning classification model, thus improving the efficiency and accuracy of recognition.

Proceed to Step S12 when it is determined that the to-be-resolved identifier can be converted.

In this embodiment, the determining whether the to-be-resolved identifier can be converted may include, but is not limited to:

In step S111, it is to determine whether domain name root data exists in an identifier root service for the Internet of Things.

If the domain name root data exists, then it indicates that the identifier can be converted.

Alternatively, the determining whether the identifier can be converted may include, but is not limited to:

In step S112, it is to determine whether a system allows conversion of the identifier.

If the system allows conversion of the identifier, it is determined that the identifier can be converted; if the system does not allow conversion of the identifier, it is determined that the identifier cannot be converted.

In step S12, the to-be-resolved identifier is converted into a domain name.

In this embodiment, the converting the to-be-resolved identifier into a domain name may include the following step S121-S122.

In step S121, a type of the to-be-resolved identifier is determined.

In step S122, a conversion manner corresponding to the type of the to-be-resolved identifier is selected, and the to-be-resolved identifier is converted into a domain name.

For example, when it is determined that the type of the to-be-resolved identifier is EPC or OID, a rule conversion method (e.g. regular expression) may be selected to convert the to-be-resolved identifier into a domain name; when it is determined that the type of the to-be-resolved identifier is Handle, a mapping conversion method may be selected to convert the to-be-resolved identifier into a domain name.

For the Handle type of the to-be-resolved identifier, the process of selecting a mapping conversion method and converting the to-be-resolved identifier into a domain name may include:

obtaining a Handle resolution system;

resolving the to-be-resolved identifier based on the Handle resolution system, to obtain a resolution result; and determining a domain name corresponding to the resolution result, based on a pre-built mapping relationship between resolution results and domain names.

In step S13, it is to request, by the conversion layer, domain name root data corresponding to the domain name from the identifier root service for the Internet of Things; obtain, by the conversion layer, a domain name resolution system from the access layer upon receiving the domain name root data returned by the identifier root service for the Internet of Things; and resolve the domain name based on the domain name root data and the domain name resolution system.

In this embodiment, the identifier resolution system includes, but is not limited to, any one or more of a DNS resolution system, a Handle resolution system, an OID resolution system and an EPC system.

In the present disclosure, different identifier resolution systems are compatible through constructing an identifier resolution architecture for the Internet of Things, and a unified method is used for resolving various identifiers. Therefore, it is simply required to maintain one identifier resolution architecture for the Internet of Things when resolving different identifiers, which reduces the workload and difficulty for maintenance of the identifier resolution system and thus reduces the workload and difficulty for maintenance of the Internet of Things.

Moreover, due to the extensive deployment of DNS infrastructure, mature and reliable service capability and safety assurance ability, and a low development cost for registration, resolution and query, it is of more reliability and lower development costs through converting the identifier into a domain name and resolving the domain name.

Figure 3:
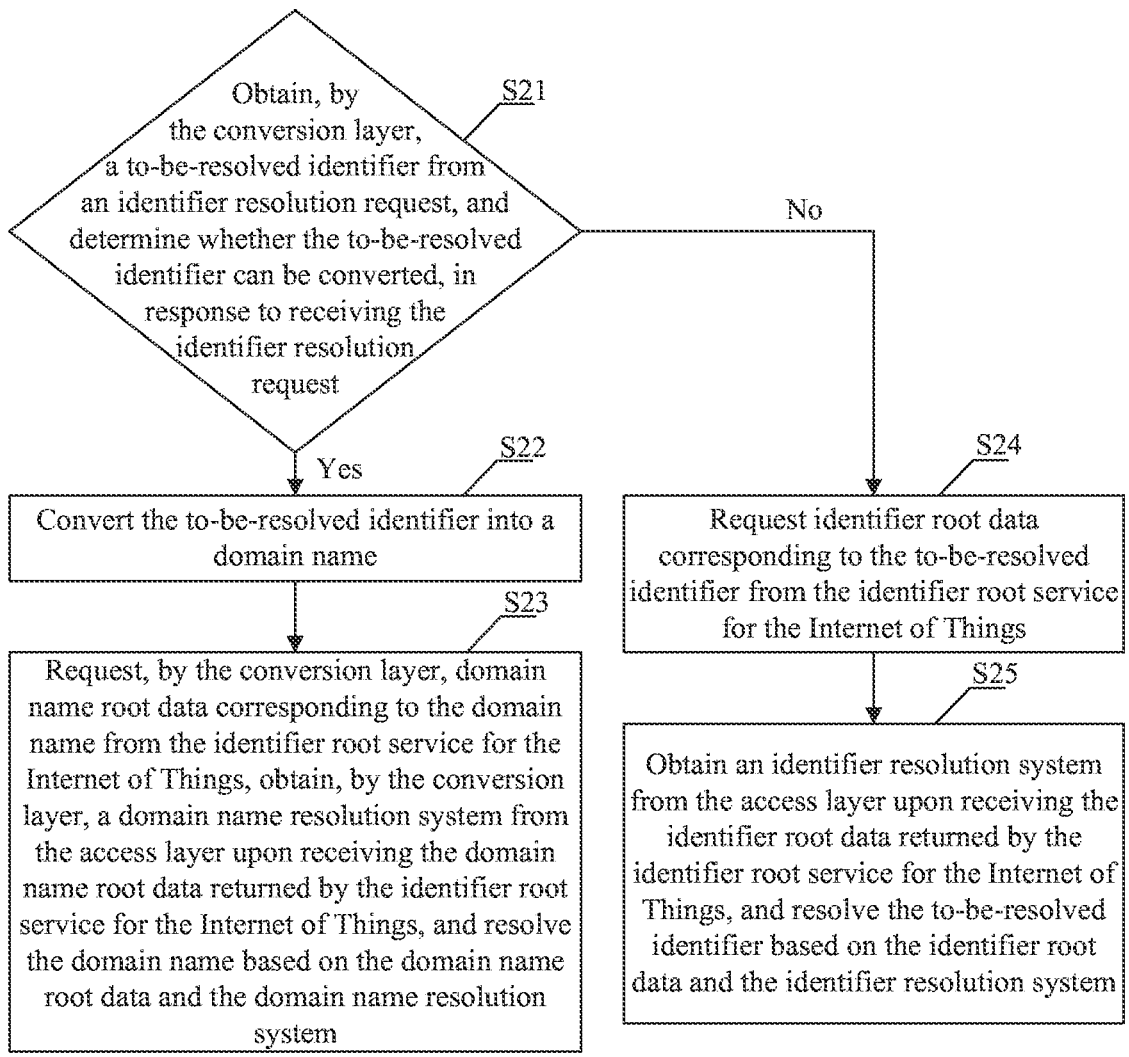
FIG. 3 shows a flow chart of an identifier resolution method for the Internet of Things according to a second embodiment of the present disclosure.

As another optional embodiment of the present disclosure, FIG. 3 shows a flow chart of an identifier resolution method for the Internet of Things according to a second embodiment of the present disclosure. This embodiment is mainly an extended solution of the identifier resolution method for the Internet of Things described in the above first embodiment. As shown in FIG. 3, the method may include, but is not limited to the following steps S21-S25.

In step S21, it is to obtain, by the conversion layer, a to-be-resolved identifier from an identifier resolution request, and determine whether the to-be-resolved identifier can be converted, in response to receiving the identifier resolution request.

Proceed to Step S22 when it is determined that the identifier can be converted; else, proceed to step S24.

In step S22, the to-be-resolved identifier is converted into a domain name.

In step S23, it is to request, by the conversion layer, domain name root data corresponding to the domain name from the identifier root service for the Internet of Things; obtain, by the conversion layer, a domain name resolution system from the access layer upon receiving the domain name root data returned by the identifier root service for the Internet of Things; and resolve the domain name based on the domain name root data and the domain name resolution system.

The detailed process of steps S21-S23 may be referred to the related description of steps S11-S13 in the first embodiment, and will not be repeated here.

In step S24, identifier root data corresponding to the to-be-resolved identifier is requested from the identifier root service for the Internet of Things.

In step S25, an identifier resolution system is obtained from the access layer upon receiving the identifier root data returned by the identifier root service for the Internet of Things, and the to-be-resolved identifier is resolved based on the identifier root data and the identifier resolution system.

In this embodiment, since the conversion layer accesses various identifier resolution systems, and the identifier root service for the Internet of Things manages various identifier root data, in a case that the identifier cannot be converted, and the to-be-resolved identifier cannot be resolved by its domain names, the identifier root data and the identifier resolution system corresponding to the to-be-resolved identifier may be obtained, and the to-be-resolved identifier may be resolved based on the identifier root data and the identifier resolution system, thus to ensure the reliability in resolving the to-be-resolved identifier.

Figure 4:
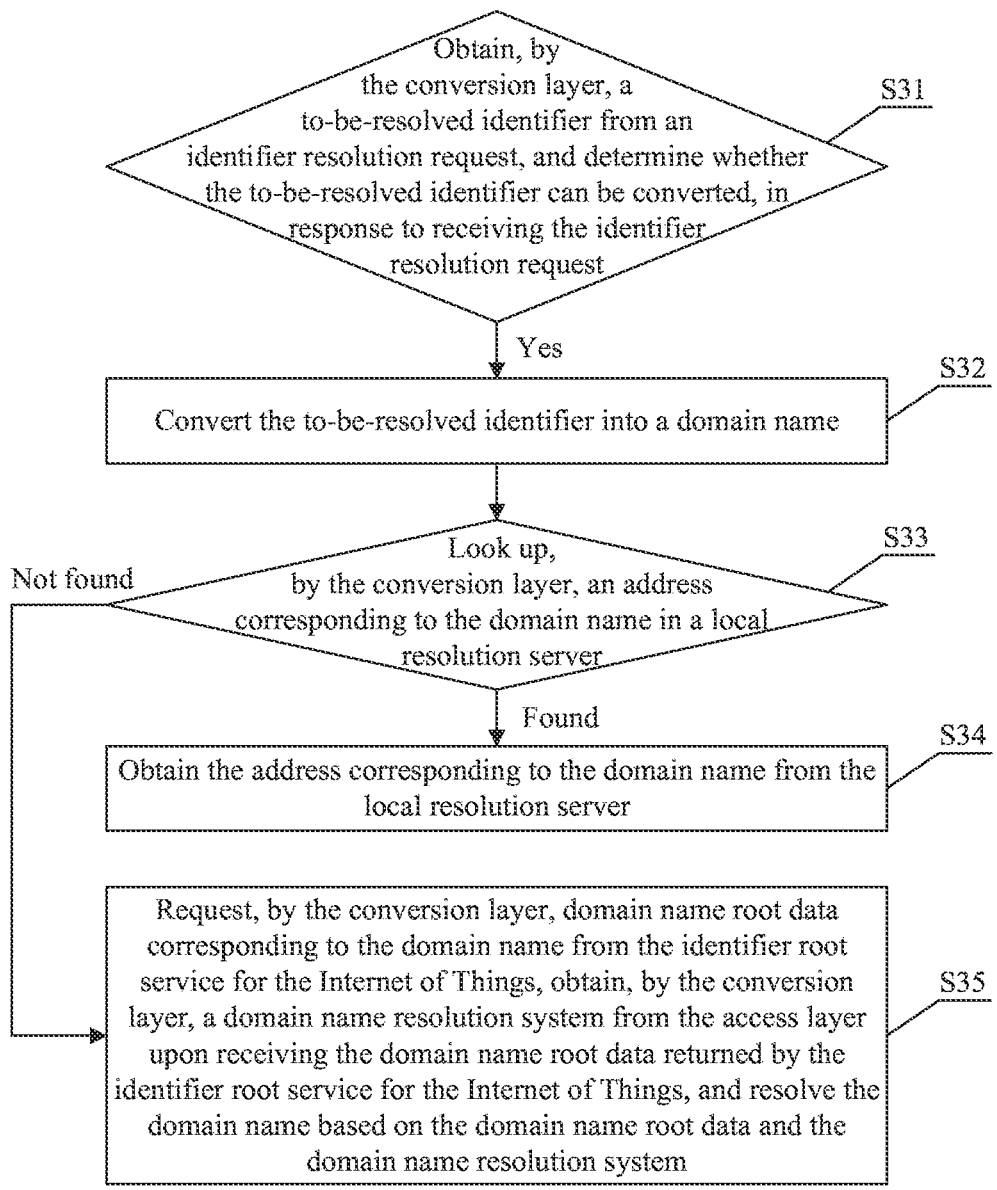
FIG. 4 shows a flow chart of an identifier resolution method for the Internet of Things according to a third embodiment of the present disclosure.

As another optional embodiment of the present disclosure, FIG. 4 shows a flow chart of an identifier resolution method for the Internet of Things according to a third embodiment of the present disclosure. This embodiment is mainly an extended solution of the identifier resolution method for the Internet of Things described in the above first embodiment. As shown in FIG. 4, the method may include, but is not limited to the following steps S31-S35.

In step S31, it is to obtain, by the conversion layer, a to-be-resolved identifier from an identifier resolution request, and determine whether the to-be-resolved identifier can be converted, in response to receiving the identifier resolution request.

Proceed to Step S32 when it is determined that the identifier can be converted.

In step S32, the to-be-resolved identifier is converted into a domain name.

In step S33, an address corresponding to the domain name is looked up in a local resolution server by the conversion layer.

In this embodiment, a correspondence between domain names and full addresses may be cached in a local resolution server, and the conversion layer may directly look up the address corresponding to the domain name in the local resolution server.

Proceed to Step S34 when the address corresponding to the domain name has been found; else, proceed to step S35.

In step S34, the address corresponding to the domain name is obtained from the local resolution server.

In step S35, it is to request, by the conversion layer, domain name root data corresponding to the domain name from the identifier root service for the Internet of Things; obtain, by the conversion layer, a domain name resolution system from the access layer upon receiving the domain name root data returned by the identifier root service for the Internet of Things; and resolve the domain name based on the domain name root data and the domain name resolution system.

In this embodiment, it is to look up an address corresponding to the domain name from the local resolution server by the conversion layer, and the address corresponding to the domain name is obtained from the local resolution server when the address has been found, thus to realize the resolution of a domain name and improve the resolution efficiency.

Figure 5:
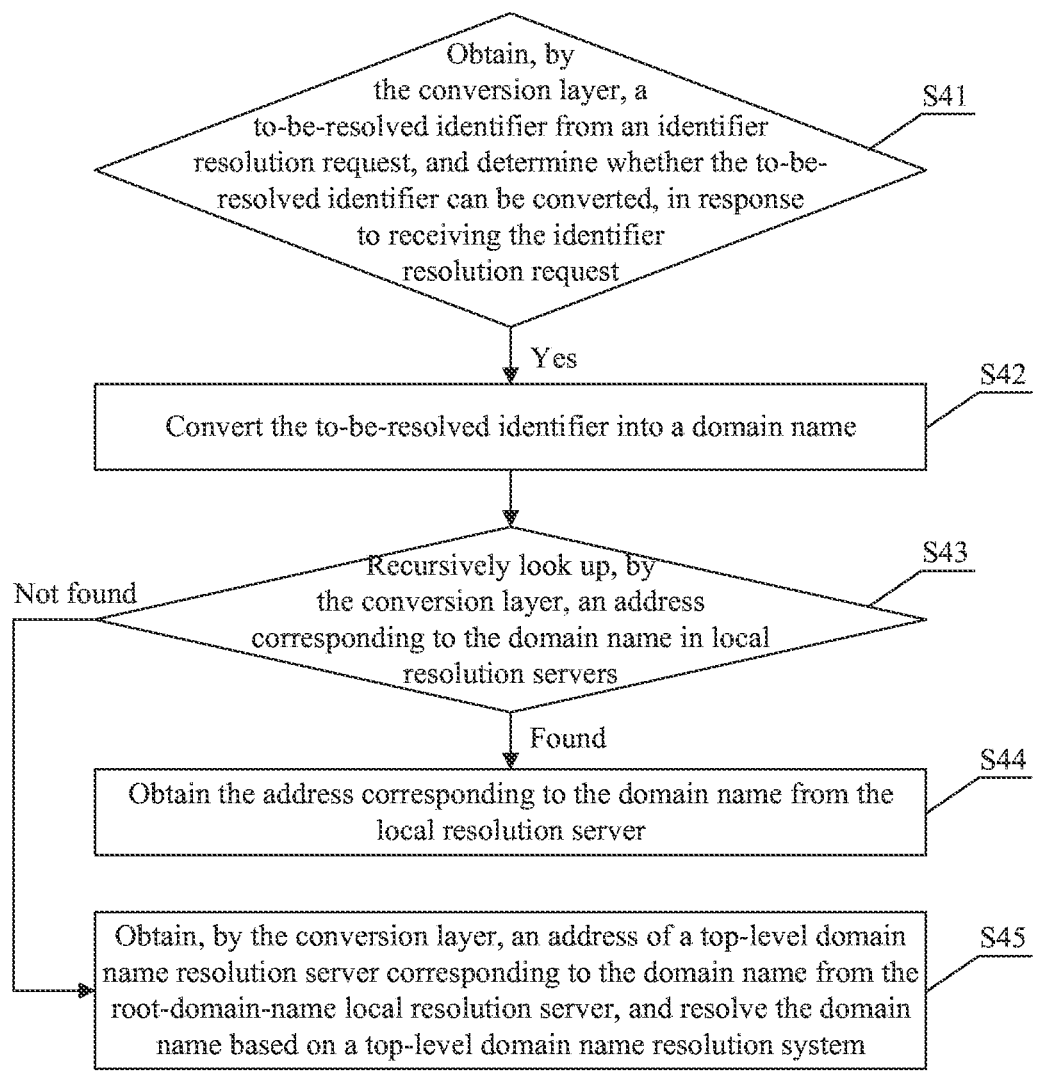
FIG. 5 shows a flow chart of an identifier resolution method for the Internet of Things according to a fourth embodiment of the present disclosure.

As another optional embodiment of the present disclosure, FIG. 5 shows a flow chart of an identifier resolution method for the Internet of Things according to a fourth embodiment of the present disclosure. This embodiment is mainly an extended solution of the identifier resolution method for the Internet of Things described in the above first embodiment. As shown in FIG. 5, the method may include, but is not limited to the following steps S41-S45.

In step S41, it is to obtain, by the conversion layer, a to-be-resolved identifier from an identifier resolution request, and determine whether the to-be-resolved identifier can be converted, in response to receiving the identifier resolution request.

Proceed to Step S42 when it is determined that the identifier can be converted.

In step S42, the to-be-resolved identifier is converted into a domain name.

In step S43, an address corresponding to the domain name is recursively looked up in multiple local resolution servers at different levels by the conversion layer.

In this embodiment, a correspondence between domain names and full addresses may be cached in the local resolution servers at different levels. For example, a root-domain-name local resolution server caches identifier root data for the Internet of Things, for example, an address of a top-level domain name server, such as ".com", ".net", or the like. Some local resolution server caches a correspondence between hot domain names and their addresses. Correspondingly, the recursive look-up process may include: looking up an address corresponding to the domain name in the local resolution servers; proceeding to step S44 when the address corresponding to the domain name has been found; proceeding to step S45 when the address corresponding to the domain name does not been found.

In step S44, the address corresponding to the domain name is obtained from the local resolution server.

In step S45, an address of a top-level domain name server corresponding to the domain name is looked up in the root-domain-name local resolution server, and the domain name is resolved based on a top-level domain name resolution system to which the domain name belongs.

The localization of a root domain name resolution reduces communication request to a root server during a single traditional resolution process.

In this embodiment, multiple local resolution servers at different levels are configured to cache different data and look up recursively, thus increasing the cache hit rate and improving the resolution efficiency.

An identifier resolution apparatus for the Internet of Things according to the present disclosure will be introduced in the following. The identifier resolution apparatus for the Internet of Things described below and the identifier resolution method for the Internet of Things described above may refer to each other.

Figure 6:
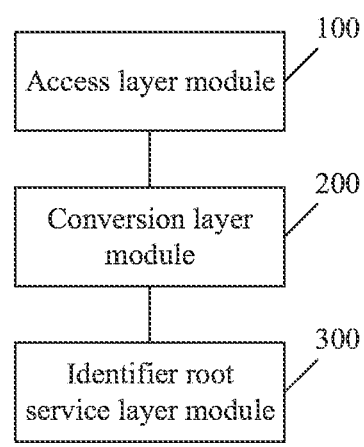
FIG. 6 shows a schematic structural diagram of an identifier resolution apparatus for the Internet of Things according to the present disclosure.

As shown in FIG. 6, the identifier resolution apparatus for the Internet of Things includes an access layer module 100, a conversion layer module 200 and an identifier root service layer module 300.

The access layer module 100 is configured to access at least one identifier resolution system.

The identifier root service layer module 300 includes an alliance chain and an identifier root service for the Internet of Things. The alliance chain includes at least one preselected node and at least one data distribution node, each preselected node separately stores a different type of root data, and the data distribution node is configured to synchronize the root data in each preselected node to the identifier root service for the Internet of Things.

The conversion layer module 200 is configured to:

obtain a to-be-resolved identifier from an identifier resolution request and determine whether the to-be-resolved identifier can be converted, in response to receiving the identifier resolution request;

convert the to-be-resolved identifier into a domain name when the to-be-resolved identifier can be converted; and request domain name root data corresponding to the domain name from the identifier root service for the Internet of Things, obtain a domain name resolution system from the access layer module upon receiving the domain name root data returned by the identifier root service for the Internet of Things, and resolve the domain name based on the domain name root data and the domain name resolution system.

In an embodiment, the conversion layer module 200 is further configured to:

request identifier root data corresponding to the to-be-resolved identifier from the identifier root service for the Internet of Things, when the to-be-resolved identifier cannot be converted; and obtain an identifier resolution system from the access layer module upon receiving the identifier root data returned by the identifier root service for the Internet of Things, and resolve the to-be-resolved identifier based on the identifier root data and the identifier resolution system.

In an embodiment, the conversion layer module 200 is further configured to:

look up an address corresponding to the domain name in a local resolution server, before requesting the domain name root data corresponding to the domain name from the identifier root service for the Internet of Things;

obtain the address corresponding to the domain name from the local resolution server, if the address corresponding to the domain name has been found; and request the domain name root data corresponding to the domain name from the identifier root service for the Internet of Things, if the address corresponding to the domain name does not been found.

In an embodiment, the conversion layer module 200 is specifically configured to:

recognize an identifier in the identifier resolution request based on a machine learning classification model, and determine the recognized identifier as the to-be-resolved identifier. The machine learning classification model is trained with a training set of identifier samples.

In an embodiment, the identifier resolution system may include, but is not limited to any one or more of a DNS resolution system, a Handle resolution system, an OID resolution system and an EPC system.

It should be noted that each embodiment focuses on the differences from other embodiments, and the same or similar parts between the various embodiments may be referred to each other. For the apparatus embodiment, since it is basically similar to the method embodiments, the description thereof is relatively simple, and the related parts may be referred to the description of the method embodiments.

It should be further noted that a relationship term such as "first" and "second" herein is only used to distinguish one entity or operation from another entity or operation, and does not necessarily require or imply that there is an actual relationship or sequence between these entities or operations. Furthermore, terms "include", "comprise" or any other variations are intended to be non-exclusive, so that a process, a method, an object or a device including a series of elements not only include these elements, but also include other elements not explicitly listed, or also include elements inherent to the process, the method, the object or the device. Without more limitations, an element defined by a sentence "include a . . . " does not exclude a case that there is also other same element in the process, the method, the object or the device including the described elements.

For the convenience of description, when describing the above apparatus, the apparatus is divided into various units with regard to functions and the units are described separately. Obviously, when implementing the present disclosure, functions of the various units may be implemented in a same one or more software and/or hardware.

From the description of the foregoing embodiments, those skilled in the art may clearly understand that the present disclosure may be implemented by means of software plus a necessary general hardware platform. According to such understanding, the essence of the technical solution of the present disclosure or the parts contributing to the conventional technology may be embodied in the form of a software product, and the computer software product may be stored in a storage medium, such as ROM/RAM, magnetic disk, CD-ROM, or the like, including several instructions to make a computer device (e.g., a personal computer, a server, a network device, or the like) perform the method described in each embodiment or some parts of the embodiment of the present disclosure.

An identifier resolution method and apparatus for the Internet of Things have been introduced specifically in the above. Specific examples are used herein to illustrate the principle and implementation of the present disclosure. The description of the above embodiments is only used to help understand the method and core idea of the present disclosure. Moreover, for those of ordinary skill in the art, changes may be made to the specific implementation and the application scope according to the idea of the present disclosure. In summary, contents in this specification shall not be construed as a limitation to the present disclosure.

The invention claimed is:

1. An identifier resolution method for the Internet of Things, which is based on an identifier resolution architecture for the Internet of Things, wherein the identifier resolution architecture for the Internet of Things comprises: an access layer, a conversion layer and an identifier root service layer, wherein the access layer is configured to access at least one identifier resolution system;

the conversion layer is at least configured for conversion between an identifier and a domain name; and the identifier root service layer comprises an alliance chain and an identifier root service for the Internet of Things, wherein the alliance chain comprises at least one preselected node and at least one data distribution node; each preselected node separately stores a different type of root data, and the data distribution node is configured to synchronize the root data in each preselected node to the identifier root service for the Internet of Things;

wherein the identifier resolution method comprises:

obtaining, by the conversion layer, a to-be-resolved identifier from an identifier resolution request, and determining whether the to-be-resolved identifier can be converted, in response to receiving the identifier resolution request;

converting the to-be-resolved identifier into a domain name, when the to-be-resolved identifier can be converted;

requesting, by the conversion layer, domain name root data corresponding to the domain name from the identifier root service for the Internet of Things; and obtaining, by the conversion layer, a domain name resolution system from the access layer upon receiving the domain name root data returned by the identifier root service for the Internet of Things, and resolving the domain name based on the domain name root data and the domain name resolution system.

2. The identifier resolution method according to claim 1, further comprising:

requesting identifier root data corresponding to the to-be-resolved identifier from the identifier root service for the Internet of Things, when the to-be-resolved identifier cannot be converted;

obtaining an identifier resolution system from the access layer upon receiving the identifier root data returned by the identifier root service for the Internet of Things, and resolving the to-be-resolved identifier based on the identifier root data and the identifier resolution system.

3. The identifier resolution method according to claim 1, wherein before the requesting, by the conversion layer, domain name root data corresponding to the domain name from the identifier root service for Internet of Things, the identifier resolution method further comprises:

looking up, by the conversion layer, an address corresponding to the domain name in a local resolution server;

obtaining the address corresponding to the domain name from the local resolution server, if the address corresponding to the domain name has been found; and requesting the domain name root data corresponding to the domain name from the identifier root service for the Internet of Things, if the address corresponding to the domain name has not been found.

4. The identifier resolution method according to claim 1, wherein the obtaining a to-be-resolved identifier from the identifier resolution request comprises:

recognizing an identifier in the identifier resolution request based on a machine learning classification model, and determining the recognized identifier as the to-be-resolved identifier, wherein the machine learning classification model is trained with a training set of identifier samples.

5. The identifier resolution method according to claim 1, wherein the identifier resolution system comprises at least one of a DNS resolution system, a Handle resolution system, an OID resolution system and an EPC system.

6. An identifier resolution apparatus for the Internet of Things, comprising an access layer server, a conversion layer server and an identifier root service layer server, wherein the access layer server is configured to access at least one identifier resolution system;

the identifier root service layer server comprises an alliance chain and an identifier root service for the Internet of Things, wherein the alliance chain comprises at least one preselected node and at least one data distribution node, each preselected node separately stores a different type of root data, and the data distribution node is configured to synchronize the root data in each preselected node to the identifier root service for the Internet of Things; and the conversion layer server is configured to:

obtain a to-be-resolved identifier from an identifier resolution request and determine whether the to-be-resolved identifier can be converted, in response to receiving the identifier resolution request;

convert the to-be-resolved identifier into a domain name when the to-be-resolved identifier can be converted; and request domain name root data corresponding to the domain name from the identifier root service for the Internet of Things, obtain a domain name resolution system from the access layer server upon receiving the domain name root data returned by the identifier root service for the Internet of Things, and resolve the domain name based on the domain name root data and the domain name resolution system.

7. The identifier resolution apparatus according to claim 6, wherein the conversion layer server is further configured to:

request identifier root data corresponding to the to-be-resolved identifier from the identifier root service for the Internet of Things, when the to-be-resolved identifier cannot be converted; and obtain an identifier resolution system from the access layer server upon receiving the identifier root data returned by the identifier root service for the Internet of Things, and resolve the to-be-resolved identifier based on the identifier root data and the identifier resolution system.

8. The identifier resolution apparatus according to claim 6, wherein the conversion layer server is further configured to:

look up an address corresponding to the domain name in a local resolution server, before requesting the domain name root data corresponding to the domain name from the identifier root service for the Internet of Things;

obtain the address corresponding to the domain name from the local resolution server, if the address corresponding to the domain name has been found; and request the domain name root data corresponding to the domain name from the identifier root service for the Internet of Things, if the address corresponding to the domain name has not been found.

9. The identifier resolution apparatus according to claim 6, wherein the conversion layer server is configured to:

recognize an identifier in the identifier resolution request based on a machine learning classification model, and determine the recognized identifier as the to-be-resolved identifier, wherein the machine learning classification model is trained with a training set of identifier samples.

10. The identifier resolution apparatus according to claim 6, wherein the identifier resolution system comprises at least one of a DNS resolution system, a Handle resolution system, an OID resolution system and an EPC system.

* * * * *